UNITED STATES PATENT OFFICE.

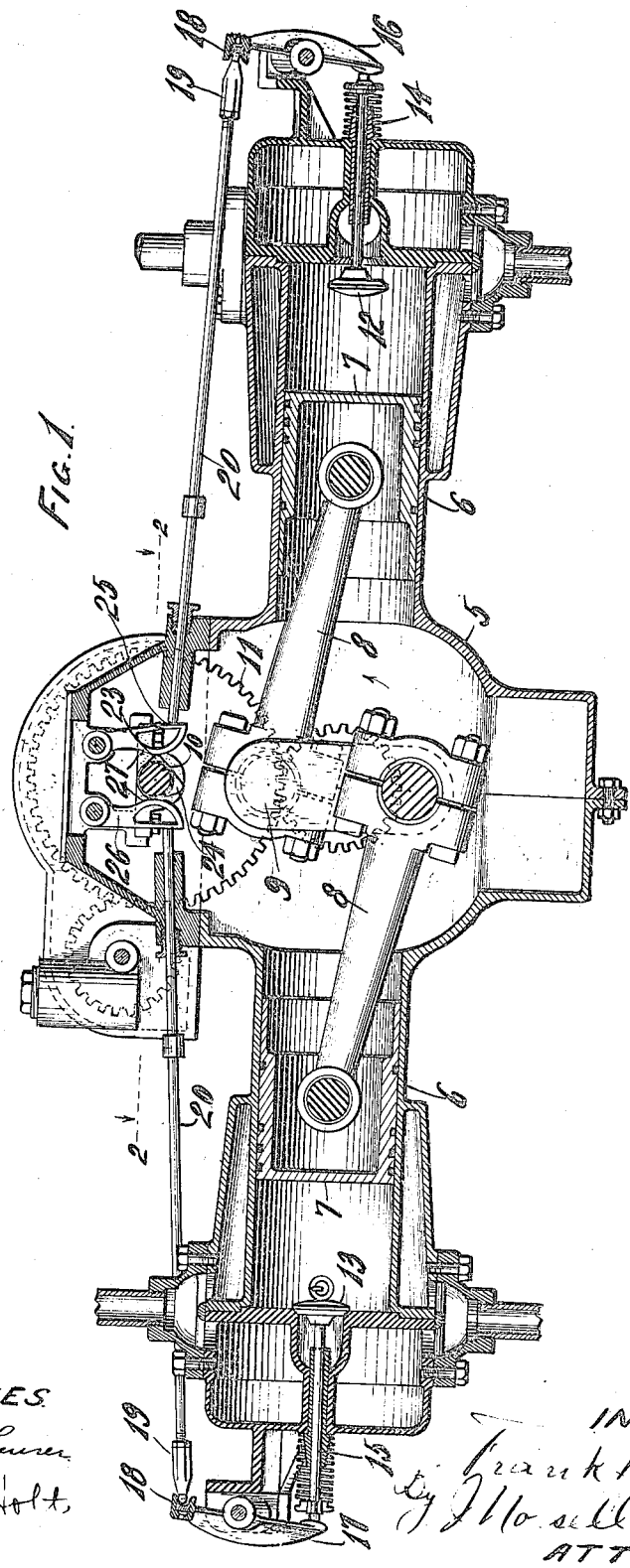

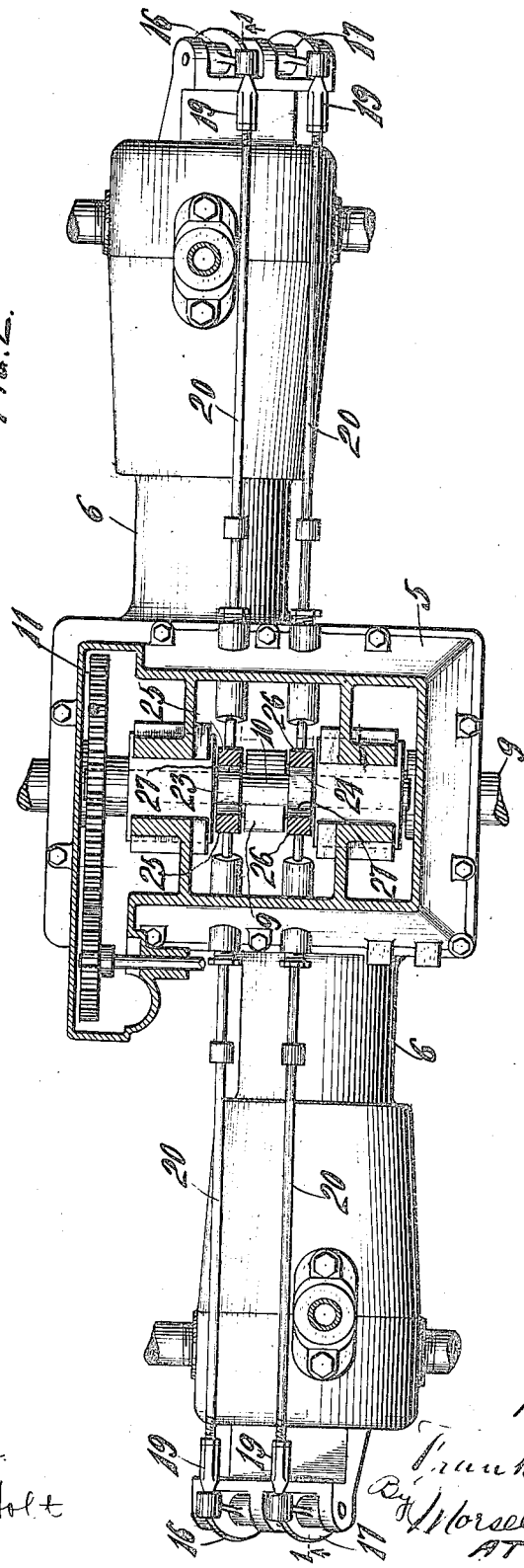

FRANK M. DAVIS, OF MILWAUKEE, WISCONSIN.

VALVE MECHANISM.

1,231,572.  Specification of Letters Patent.  Patented July 3, 1917.

Application filed July 17, 1913. Serial No. 779,445.

*To all whom it may concern:*

Be it known that I, FRANK M. DAVIS, a citizen of the United States, and resident of Milwaukee, in the county of Milwaukee and State of Wisconsin, have invented new and useful Improvements in Valve Mechanisms, of which the following is a description, reference being had to the accompanying drawings, which are a part of this specification.

This invention relates to improvements in valve mechanisms for internal combustion engines.

It is one of the objects of the present invention to provide a valve mechanism in which the valve connecting rods are engaged by levers which give a more straight line thrust to the said rods than the ordinary practice of directly engaging the rod ends with the actuating cams.

A further object of the invention is to provide a valve mechanism in which the parts may be easily adjusted to take up wear and to regulate the time of the opening of the valves.

A further object of the invention is to provide a valve mechanism which is strong and durable and is well adapted for the purpose described.

In the accompanying drawings in which the same reference characters indicate the same parts in all of the views:

Figure 1 is a longitudinal sectional view taken on line 1—1 of Fig. 2 of a two cylinder opposed engine provided with the improved valve mechanism; and Fig. 2 is a sectional view thereof taken on line 2—2 of Fig. 1.

Referring to the drawings the numeral 5 indicates the crank chamber, 6 the engine cylinders, 7 the pistons, 8 the connecting rods, 9 the cranked shaft and 10 the cam shaft which is rotated by the geared connection 11 with the cranked shaft 10.

Spring retrieved inlet and exhaust valves 12 and 13 are mounted in the cylinder ends and have their stems 14 and 15 projecting through the ends and abutting against the valve levers 16 and 17. The opposite ends of the levers are provided with half spherical sockets 18 to receive the ball ends of the heads 19 of valve rods 20 which are slidably mounted in and extend through the crank casing into the chamber 21 thereof. The crank case openings through which the valve rods extend are provided with stuffing boxes 22 to form a tight closure.

The inlet and exhaust cams 23 and 24 mounted on the cam shaft 10 are adapted to actuate the valve rods through the cam arms 25 and 26 which are pivoted to the upper portion of the crank case and depend downwardly therefrom and their lower end portions are interposed between the cams and the inner ends of the valve rods. The inner faces 27 of the cam arms are of curved form to provide an easy engagement of the parts.

In order to accurately adjust the length of the valve rods to fit the spaces between the valve levers and the cam arms, the outer ends of the valve rods have a threaded engagement with the valve heads as indicated by the numeral 28 and nuts 29 serve to lock the parts in adjusted positions. This adjustment also provides for taking up wear between the parts.

From the foregoing description it will be seen that the construction provides for substantially a straight line engagement of the valve rods and the construction throughout is very simple and strong and durable.

What I claim as my invention is:

The combination with an internal combustion engine having spring retrieved controlling valves and a cam shaft having cams mounted thereon, of valve mechanism therefor comprising levers fulcrumed on the engine and engaging the valves, end portions of said levers provided with sockets, rod heads extending into said sockets, valve rods adjustably connected to the rod heads and extending in pairs to points on opposite sides of the cam shaft, and pivoted arms positioned on opposite sides of the cam shaft and interposed between the cam thereof and the rod ends adjacent thereto, said pivoted arms having inner rounded faces which are engaged by the cams.

In testimony whereof, I affix my signature, in presence of two witnesses.

FRANK M. DAVIS.

Witnesses:
 HENRY L. LUEDERS,
 GEO. M. KLIEGEL.